United States Patent
Roberge

(10) Patent No.: US 11,378,009 B2
(45) Date of Patent: Jul. 5, 2022

(54) MULTI-MODE HEAT REJECTION SYSTEM FOR A GAS TURBINE ENGINE

(71) Applicant: Raytheon Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/867,155

(22) Filed: May 5, 2020

(65) Prior Publication Data
US 2020/0362759 A1 Nov. 19, 2020

Related U.S. Application Data

(60) Provisional application No. 62/848,161, filed on May 15, 2019.

(51) Int. Cl.
| | |
|---|---|
| *F02C 7/14* | (2006.01) |
| *F02C 9/20* | (2006.01) |
| *F02C 7/18* | (2006.01) |
| *F02K 3/06* | (2006.01) |
| *F02C 9/16* | (2006.01) |

(52) U.S. Cl.
CPC ............... *F02C 7/14* (2013.01); *F02C 7/18* (2013.01); *F02C 9/16* (2013.01); *F02C 9/20* (2013.01); *F02K 3/06* (2013.01)

(58) Field of Classification Search
CPC .... F02C 7/14; F02C 7/141; F02C 7/18; F02C 7/185; F02C 9/16; F02C 9/18; F02C 9/20; F02K 3/06; F05D 2260/213
See application file for complete search history.

(56) References Cited

U.S. PATENT DOCUMENTS

| | | | | |
|---|---|---|---|---|
| 5,452,573 | A | * | 9/1995 | Glickstein ............... F02C 7/185 60/782 |
| 8,161,726 | B2 | | 4/2012 | Schwarz |
| 10,107,200 | B2 | * | 10/2018 | Miller ........................ F02C 9/18 |
| 10,240,531 | B2 | * | 3/2019 | Schwarz ................... F02C 7/12 |
| 10,364,750 | B2 | * | 7/2019 | Rambo ...................... F02C 7/14 |
| 10,927,761 | B2 | * | 2/2021 | Rambo ................... F02K 3/075 |
| 2008/0230651 | A1 | * | 9/2008 | Porte ......................... F02C 7/14 244/118.5 |
| 2009/0097972 | A1 | | 4/2009 | Murphy |
| 2012/0128467 | A1 | | 5/2012 | Ruthemeyer |

(Continued)

FOREIGN PATENT DOCUMENTS

EP 1944475 B1 8/2015

OTHER PUBLICATIONS

International Preliminary Report on Patentability for International Application No. PCT/US2020/032892 dated Nov. 25, 2021.

(Continued)

*Primary Examiner* — William H Rodriguez
(74) *Attorney, Agent, or Firm* — Carlson, Gaskey & Olds, P.C.

(57) ABSTRACT

A turbine engine includes a duct defining an annular passage, at least two heat exchangers arranged within the annular passage and spaced circumferentially apart, a passage between the at least two heat exchangers, and a forward flow control device operable for controlling airflow through the passages.

19 Claims, 7 Drawing Sheets

(56) References Cited

U.S. PATENT DOCUMENTS

| | | |
|---|---|---|
| 2014/0271116 A1 | 9/2014 | Snyder et al. |
| 2016/0208714 A1 | 7/2016 | Farah et al. |
| 2016/0369697 A1* | 12/2016 | Schwarz ................. F01D 25/12 |
| 2017/0044984 A1 | 2/2017 | Pesyna et al. |
| 2018/0023906 A1 | 1/2018 | Tajiri et al. |
| 2021/0071581 A1* | 3/2021 | Sodaro ...................... F02C 7/18 |

OTHER PUBLICATIONS

International Search Report and Written Opinion for International Application No. PCT/US2020/032892 dated Mar. 25, 2021.

* cited by examiner

MULTI-MODE HEAT REJECTION SYSTEM FOR A GAS TURBINE ENGINE

CROSS-REFERENCE TO RELATED APPLICATIONS

This application claims priority to U.S. Provisional Application No. 62/848,161 which was filed on May 15, 2019.

STATEMENT REGARDING FEDERALLY SPONSORED RESEARCH OR DEVELOPMENT

This subject of this disclosure was made with Government support awarded by the United States. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Fan bypass airflow is used as a heat sink as part of an engine thermal management system including a heat exchanger.

Turbine engine manufacturers continue to seek further improvements to engine performance including improvements to thermal and propulsive efficiencies.

SUMMARY

A turbine engine according to an exemplary embodiment of this disclosure include, among other possible things, a duct defining an annular passage, at least two heat exchangers arranged within the annular passage and spaced circumferentially apart, a passage between the at least two heat exchangers, and a forward flow control device operable for controlling airflow through the passages.

In a further embodiment of the foregoing turbine engine, the forward flow control device is movable from an open position allowing airflow through the passage and a closed position blocking airflow through the passage to force all airflow through the at least two heat exchangers.

In another embodiment of any of the foregoing turbine engines, the forward flow control device is movable to a plurality of intermediate positions between the open position and the closed position to control airflow through the passages and the at least two heat exchangers.

In another embodiment of any of the foregoing turbine engines, the flow control device comprises a fixed fairing and two vanes movable outward from the fixed fairing between the open position and the closed position.

In another embodiment of any of the foregoing turbine engines, the fixed fairing is disposed forward of an inlet to the passage and the vanes extend aft of the fixed fairing.

In another embodiment of any of the foregoing turbine engines, an aft flow control device is disposed on either side of an outlet of the passage between the at least two heat exchangers for defining an outlet of the passage and of the at least two heat exchangers.

In another embodiment of any of the foregoing turbine engines, the aft flow control device comprises a first vane disposed on a first side of the outlet, and a second aft vane disposed on a second side of the outlet. The first vane and the second vane are moveable between a first position defining a diverging nozzle through the passage and a second position defining a diverging nozzle of airflow exiting the at least two heat exchangers.

In another embodiment of any of the foregoing turbine engines, the aft flow control devices is moved to the first position when the forward flow control device is in an open position enabling airflow through the passage, and the aft flow control device is moved to the second position when the forward flow control device is in a closed position.

In another embodiment of any of the foregoing turbine engines, the at least two heat exchangers comprise a plurality of heat exchangers extending about the entire annular passage and a corresponding plurality of passages disposed between the plurality of heat exchangers.

In another embodiment of any of the foregoing turbine engines, the at least two heat exchangers comprise one of an air/oil heat exchanger, an air/fuel heat exchanger or an air/air heat exchanger.

In another embodiment of any of the foregoing turbine engines, the annular passage is defined between a radially inner surface and radially outer surface of the duct and each of the least two heat exchangers extend entirely between the radially inner surface and the radially outer surface.

A thermal management system for a gas turbine engine according to an exemplary embodiment of this disclosure includes, among other possible things, a plurality of heat exchangers circumferentially spaced apart within an annular duct and a plurality of passages disposed within circumferential spaces between the plurality of heat exchangers. A plurality of forward flow control devices is for distributing airflow between the plurality of passages and the plurality of heat exchangers.

In a further embodiment of the foregoing thermal management system for a gas turbine engine, each of the plurality of forward flow control devices are movable from an open position allowing airflow through the passage and a closed position blocking airflow through the passage to direct airflow through the plurality of heat exchangers.

In a further embodiment of any of the foregoing thermal management systems for a gas turbine engine, each of the plurality of forward flow control devices are movable to a plurality of intermediate positions between the open position and the closed position to proportionally control airflow through the plurality of passages and the plurality of heat exchangers.

In a further embodiment of any of the foregoing thermal management systems for a gas turbine engine, each of the plurality of flow control devices comprise a fixed fairing and two vanes movable outward from the fixed fairing between the open position and the closed position.

In a further embodiment of any of the foregoing thermal management systems for a gas turbine engine, a plurality of aft flow control devices are disposed at an outlet of each of the plurality of passages. Each of the plurality of aft flow control devices are movable to a first position defining a diverging nozzle through a corresponding one of the plurality of passages, and a second position defining a diverging nozzle of airflow exiting a corresponding one of the plurality of heat exchangers.

A method of operating a thermal management system for a turbine engine according to an exemplary embodiment of this disclosure includes, among other possible things, determining a demand for cooling of a hot medium, flowing the hot medium through at least two heat exchangers exposed to a cooling airflow, and moving a forward flow control device to a closed position in response to an increase in demand for cooling of the hot medium. In the closed position the forward flow control device blocks the cooling airflow from flowing through a passage defined between at least two heat exchangers such that the cooling airflow flows through the at least two heat exchangers. The forward flow control device is moved to an open position in response to a decrease in demand for cooling of the hot medium. In the open position the forward flow control device allows the cooling airflow to flow through the passage such that a lesser amount of cooling airflow flows through the at least two heat exchangers.

In a further embodiment of the foregoing method of operating a thermal management system for a turbine engine, an aft flow control device is operated to define a diverging nozzle aft of the at least two heat exchangers in response to the forward flow control device being in the closed position. The aft flow control device is operated to define a diverging nozzle aft of the passage in response to the forward flow control device being in the open position.

In another embodiment of any of the foregoing methods of operating a thermal management system, the forward flow control device operates to move to one of a plurality of intermediate positions between the open and closed positions to proportion cooling airflow between the passage and the at least two heat exchangers to tailor heat removal from the flow of hot medium.

In another embodiment of any of the foregoing methods of operating a thermal management system, the at least two heat exchangers are one of an air/fuel heat exchanger, an air/oil heat exchanger and/or an air/air heat exchanger.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
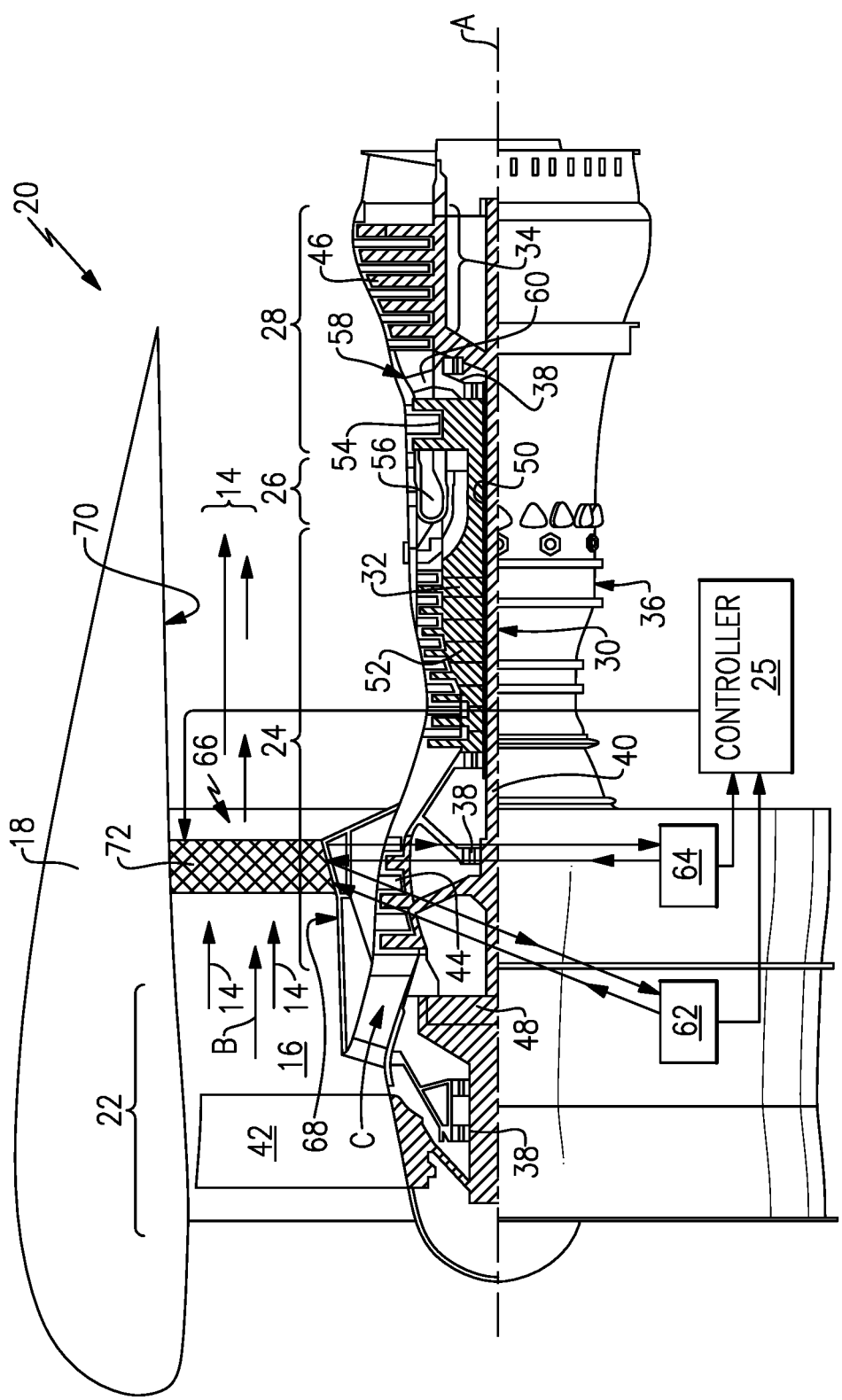
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct 16 defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{ R})/(518.7°\text{ R})]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example engine 20 includes a thermal management system 66 that cools hot flows generated in different engine systems. In one disclosed example, the thermal management system 66 includes a heat exchanger array 72 disposed within the bypass duct 16. Bypass airflow 14 cools a flow of a hot medium placed in thermal communication with the bypass airflow 14 within the heat exchanger array 72. In one disclosed example, a lubricant from a lubrication system 62 is cooled by the heat exchanger array 72. In another disclosed example embodiment, a hot airflow from an airflow system 64 is cooled by the cooler bypass airflow 14. The airflow system 64 may be a cooled cooling air system for supplying cooling air to hot portions of the engine. The example airflow system 64 may also be an environmental control system, buffer air system or any other system that utilizes an airflow and requires thermal management and control of the airflow.

The heat exchanger array 72 is disposed within an annular space between a radially inner duct surface 68 and a radially outer duct surface 70. In the disclosed example, the radially inner duct surface 68 is defined by a core cowling surrounding core engine components and the radially outer duct surface 70 is part of the nacelle 18. It should be appreciated, that the other structures within the engine 20 may define the annular passage including the heat exchanger array 72. A controller 25 uses information regarding engine operation including the information indicative of operation of the lubricant system 62 and the airflow system 64 to adjust the heat exchanger array 72 to balance thermal and propulsive engine efficiencies.

Figure 2:
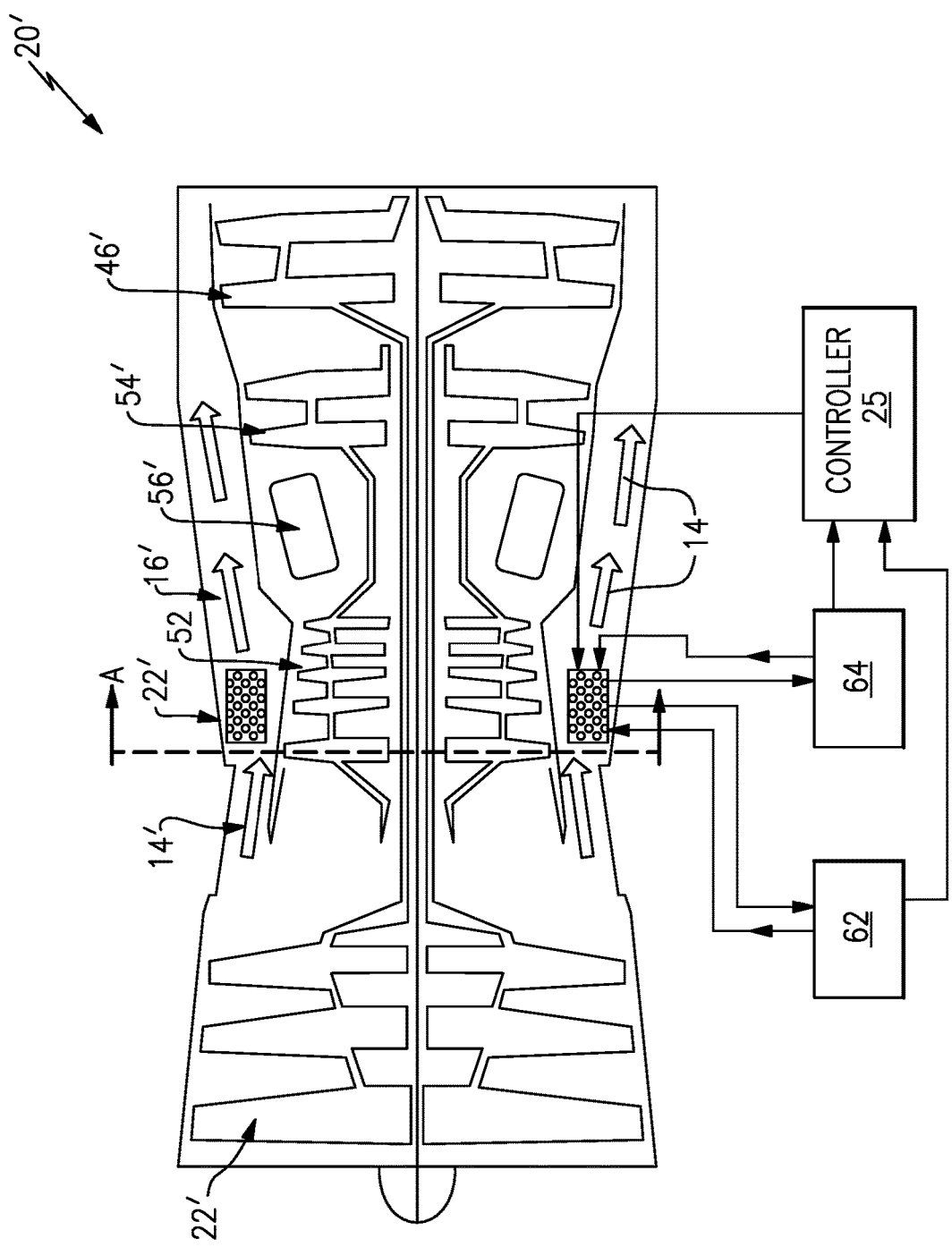
FIG. 2 is a schematic view of another example gas turbine engine.

Referring to FIG. 2, another example gas turbine engine 20' is schematically shown and includes a low to moderately sized bypass duct 16 designed to accommodate a bypass ratio between approximately 0.2 and 5.0. The example engine 20' is a direct drive engine including a direct driving connection between the low pressure turbine 46' and the fan section 22'. The heat exchanger array 72' is provided within the bypass duct 16' to place hot flows from the various example engine systems 62', 64' in communication with a cooling bypass airflow 14. The size of the duct 16' may be of different sizes including small to mid-sized ducts within the contemplation and scope of this disclosure.

Figure 3:
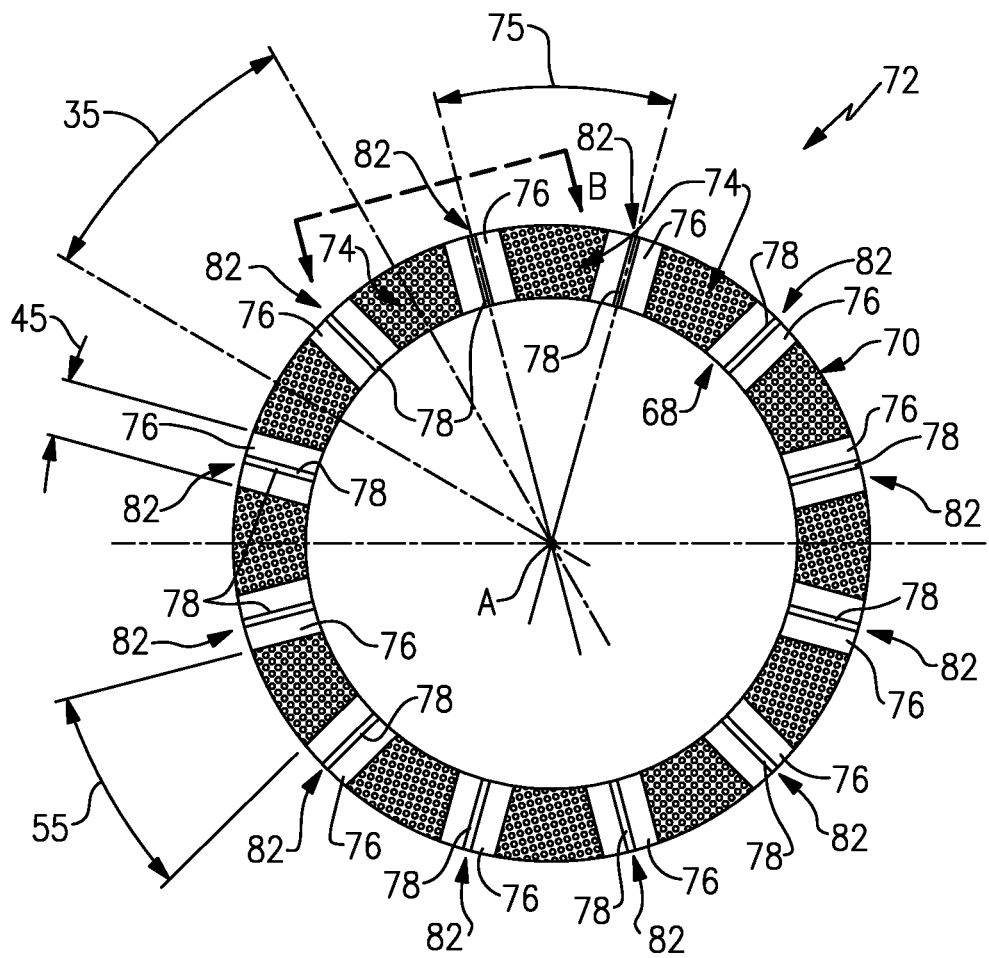
FIG. 3 is a schematic view of an example thermal management system including an example heat exchanger array.

Referring to FIG. 3, with continued reference to the engine of FIG. 1 by way of example, the heat exchanger array 72 includes a plurality of individual heat exchangers 74 that are spaced circumferentially apart about the entire circumference of the duct 16. A plurality of passages 76 are provided between the spaced apart heat exchangers 74. Each of the passages 76 provide little restriction to the cooling airflow 14. In contrast, cooling airflow 14 that is directed through the heat exchangers 74 encounters resistance that can produce a pressure drop aft of the heat exchanger array 72. Each of heat exchangers 74 extend entirely across the duct 16 from the inner radial surface 68 to the outer radial surface 70.

In this example, a centerline of each of the heat exchangers 74 are spaced an angular distance 35 apart from each other. The passages 76 are spaced an angular distance 75 apart from each other. The passages 76 have a lateral width 45 and the heat exchangers 74 have a lateral 55. In this disclosed example, the width 45 of the passages 76 are all the same. In this disclosed example, the width 55 of each of the heat exchangers 74 are all the same. The width 45 of the passages 76 combine to define a total opening area for flow around and between the heat exchangers 74. The combined width 55 of the heat exchangers 74 combine to define a total area for the heat exchangers 74. In this example, the width 55 of the heat exchangers 74 is greater than the width 45 of the passages 76. However, it is within the contemplation of this disclosure that the width 45 of the passages 76 maybe greater than the width 55 of the heat exchangers 74. Moreover, it is further within the contemplation of this disclosure that the widths of the passages 76 and the heat exchangers, and thereby the respective flow areas may vary about the circumference of the engine 20.

The example heat exchangers 74 may comprise an air/oil heat exchanger, an air/fuel heat exchanger an air/air heat exchanger or any combination and variation of heat exchanger. Moreover, the heat exchanger 74 type may vary about the circumference of the duct. Some of the heat exchangers 74 could be configured to cool lubricant while others are configured cool air or fuel. The specific features of each heat exchanger 74 may vary to provide cooling of several different hot flow media from the engine 20.

In some operational conditions, a minimal amount of cooling is required and therefore the pressure drop of the bypass cooling flow 14 induced by flow through the heat exchangers 74 is unnecessary and undesirable. In other operational conditions, a maximum amount of cooling is required and any amount of efficiency losses induced by a pressure drop across the heat exchanger is outweighed by the cooling requirement. Accordingly, the cooling capacity and pressure drop across the example heat exchanger array 72 are adjustable to tailor thermal cooling capabilities to current engine operating conditions.

A forward flow control device 82 is disposed at each of the passages 76 to control and distribute the cooling airflow 14. The cooling airflow 14 is distributed between the passages 76 and the heat exchangers 74 depending on engine cooling needs. Moreover, the amount of pressure drop across the heat exchanger array 72 can be adjusted to optimize specific engine operating parameters.

Figure 4:
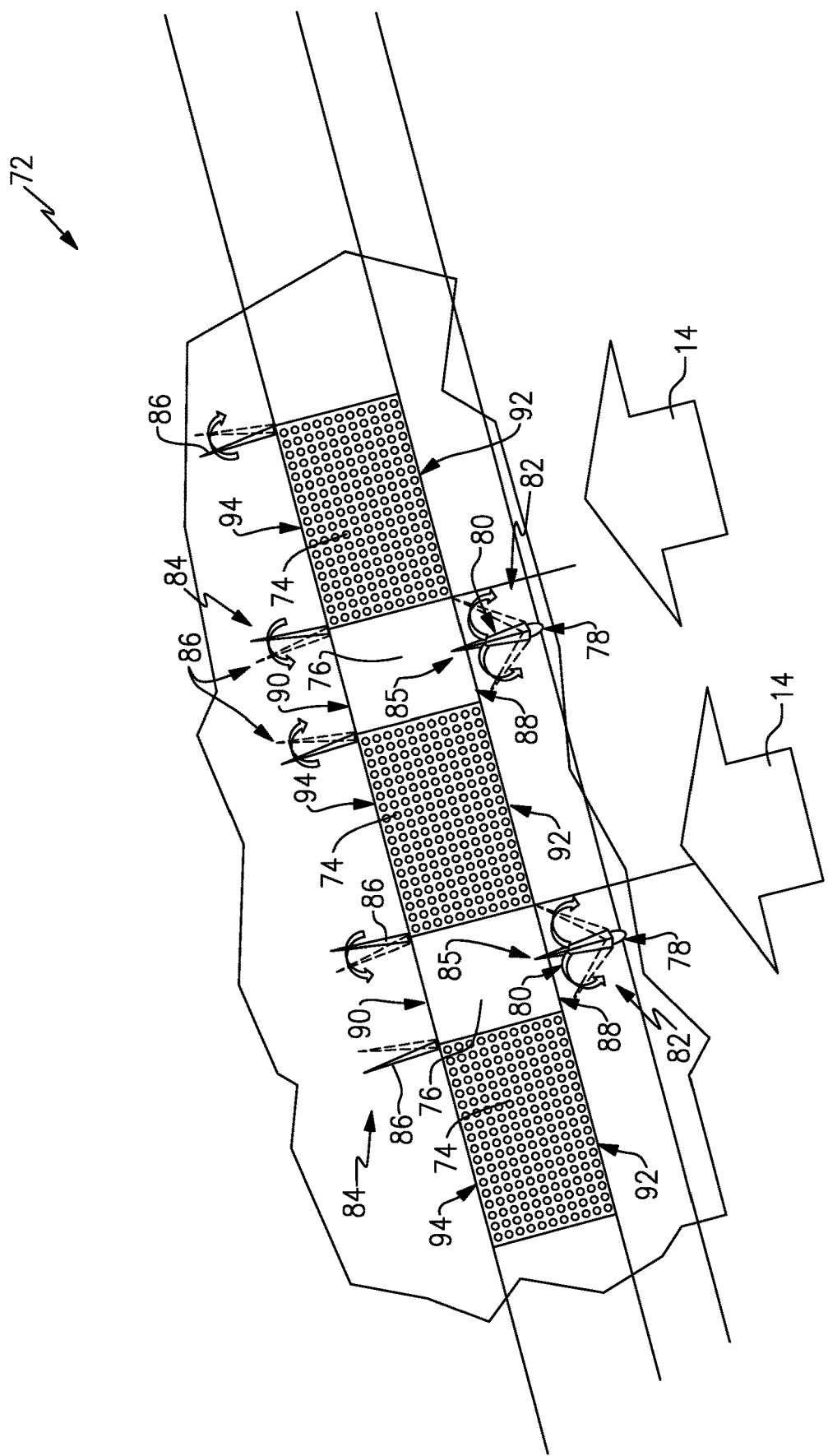
FIG. 4 is a portion of the example heat exchanger array.

Referring to FIG. 4 with continued reference to FIG. 3, each of the forward flow control devices 82 include a forward located fixed fairing 78 and movable vanes 80. The fairing 78 is disposed forward of an inlet 88 of each of the passages 76 and is shaped in a manner determined to lessen any disruption of the cooling airflow 14 flowing into the passage 76. In this disclosed example, the fairings 78 includes an elliptical forward surface for directing airflow in an aerodynamically efficient manner around the vanes 80 disposed behind the fairings 78. The fairings 78 therefore include an aerodynamic shape that reduces disruption of the cooling airflow 14. The vanes 80 extend aft of the fairing 78 and taper to a pointed trailing edge 85. The shape of the fairing 78 and vanes 80 is defined to minimize any disruption to the cooling airflow 14 when in the folded position show in FIG. 4. The folded position shown in FIG. 4 corresponds with an open position for the passages 76. In this mode, a portion of the bypass flow 14 passes through the heat exchanger array 72 providing limited cooling, and the remainder of the flow is routed through passages 76.

The vanes 80 are movable to a closed position that blocks the airflow 14 from entering the passages 76. In the closed position, the vanes 80 are expanded outward as is indicated by dotted lines in FIG. 4. In the closed position, the airflow 14 through the duct 16 is directed through one of the heat exchangers 74 to provide a maximum cooling condition. By opening and closing the vanes 80, the amount of flow through passages 76 and the heat exchangers 74 can be varied and controlled to maximize engine operating efficiencies.

The passages 76 each include an outlet 90 that includes an aft flow control device 84. The aft flow control device 84 adjusts flow parameters for cooling airflows 14 through each of the passages 76 and the heat exchangers 74. Each of the aft flow control devices 84 include vanes 86 disposed at opposing sides of each outlet 90. The opposing sides of each outlet 90 corresponds with opposite sides of each of the heat exchangers 74. The vanes 86 are movable relative to both the outlet 90 of the passages 76 and an outlet 94 of each of the heat exchangers 74. In this disclosed example, the vanes 86 move in concert with the vanes 80 of the forward flow control devices 82 to increase flow efficiencies by diffusing and slowing the discharge of flow prior to downstream mixing. In one disclosed embodiment, the vanes 86 are moved to provide a divergent nozzle that corresponds with either the passageway 76 and/or the heat exchanger 74.

Figure 5:
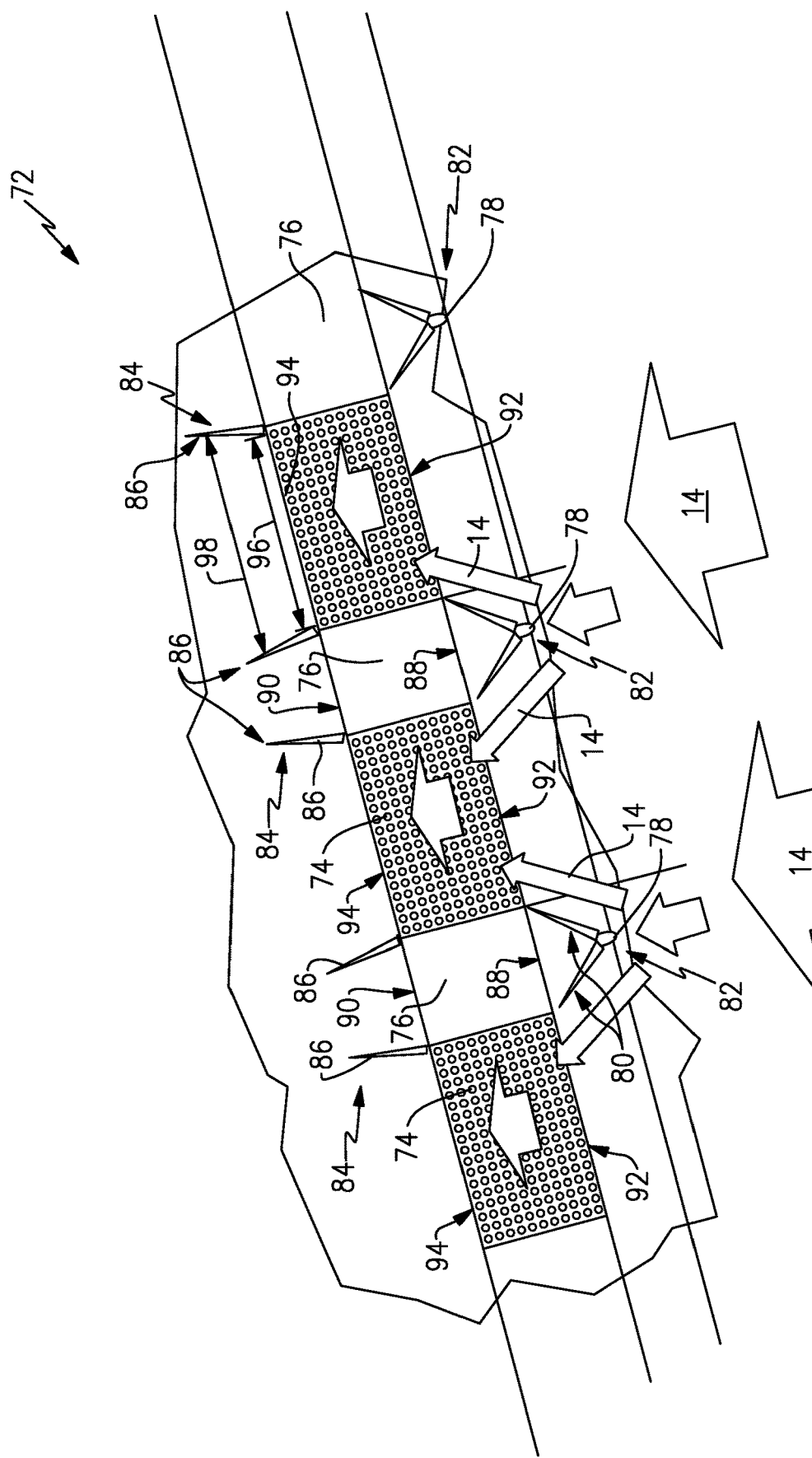
FIG. 5 is a portion of the example heat exchanger array with an example forward flow control device in a closed position.

Referring to FIG. 5, the example heat exchanger array 72 is shown with the forward flow control devices 82 in a closed position to prevent cooling airflow 14 from entering the passages 76. In the closed position, the vanes 80 are expanded outwardly relative to the forward fairing 78 to block airflow 14 into the passages 76. Accordingly, the cooling airflow 14 is forced to flow entirely through the plurality of heat exchangers 74. The cooling airflow 14 therefore flows into an inlet 92 of each of the heat exchangers 74 and out an outlet 94 of each heat exchanger 74. The aft flow control device 84 is set to provide a divergent nozzle for airflow exiting the heat exchanger 74. In this example, the vanes 86 are expanded outward relative to the outlet 94 such that a distance 98 at a distal end of each vane 86 is greater than a distance 96 between the vanes 86 at the outlet 94.

In the closed position shown in FIG. 5, the cooling airflow 14 is directed only through the heat exchangers 74. Accordingly, the thermal capacity of the heat exchangers 74 to removes thermal energy is at a maximum. Additionally, the pressure drop induced by flow through the heat exchangers 74 is also at a maximum.

Figure 6:
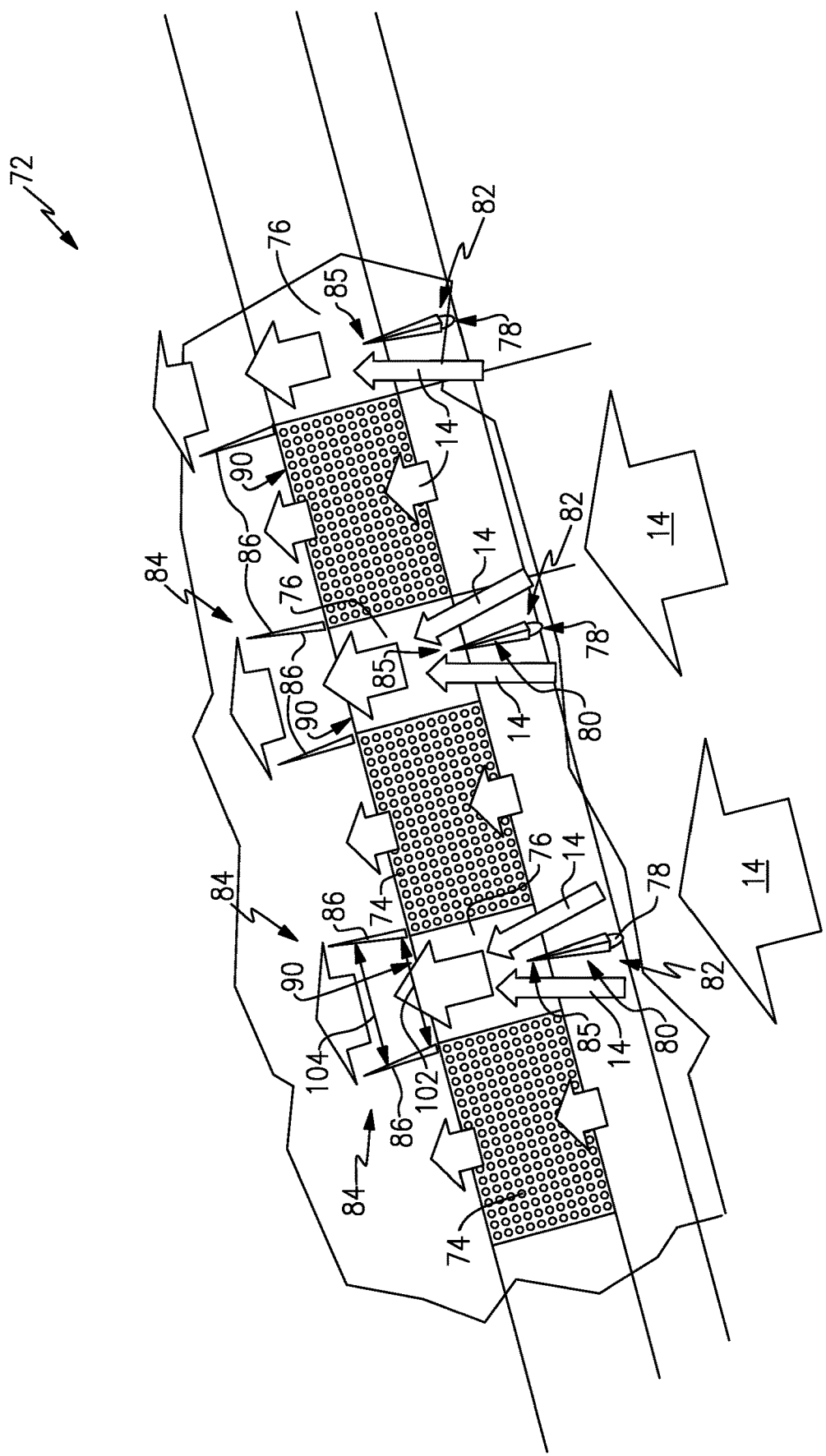
FIG. 6 is a portion of the example heat exchanger array with the example flow control device in an open position.

Referring to FIG. 6, the example heat exchanger array 72 is shown with the forward flow control device 82 in an open position to enable cooling airflow 14 through passages 76. In the open position, the vanes 80 of the forward flow control device 82 are folded behind the fairing 78 to minimize disruptions to the cooling airflow 14 entering the inlet 88 of the passage 76. The vanes 86 of the aft flow control device 84 are expanded outward relative to the outlet 90 of the passage 76. The expanded vanes 86 provide a divergent nozzle to accentuate cooling airflow through the passage 76. In this example, the divergent nozzle includes a distance 104 near ends of the vanes 86 that is greater than a distance 102 of the vanes 86 at the outlet 90. The divergent nozzle increases flow through the passages 76 to reduce any drop in pressure past the heat exchanger array 72.

In the open position, the cooling flow through the heat exchangers 74 is minimized, but is still present. In other words, cooling airflow 14 does flow through the heat exchanger 74, but only at reduced amounts as a majority of the cooling airflow 14 proceeds along the path of least resistance through the passages 76. The heat exchangers 74 operate at a minimal level of thermal acceptance capacity to maintain engine systems within operational thermal limits.

FIGS. 5 and 6 illustrate extreme positions of the heat exchanger array 72 between the closed and open positions. However, a plurality of intermediate positions for each of the of the forward and aft flow control devices 82, 84 may also be utilized to tailor operation to current engine operating conditions. The forward flow control devices 82 could remain partially open to direct more cooling airflow into the heat exchangers 74 while enabling some flow thought the passages 76 to provide an intermediate pressure drop across the heat exchanger array 72.

Figure 7:
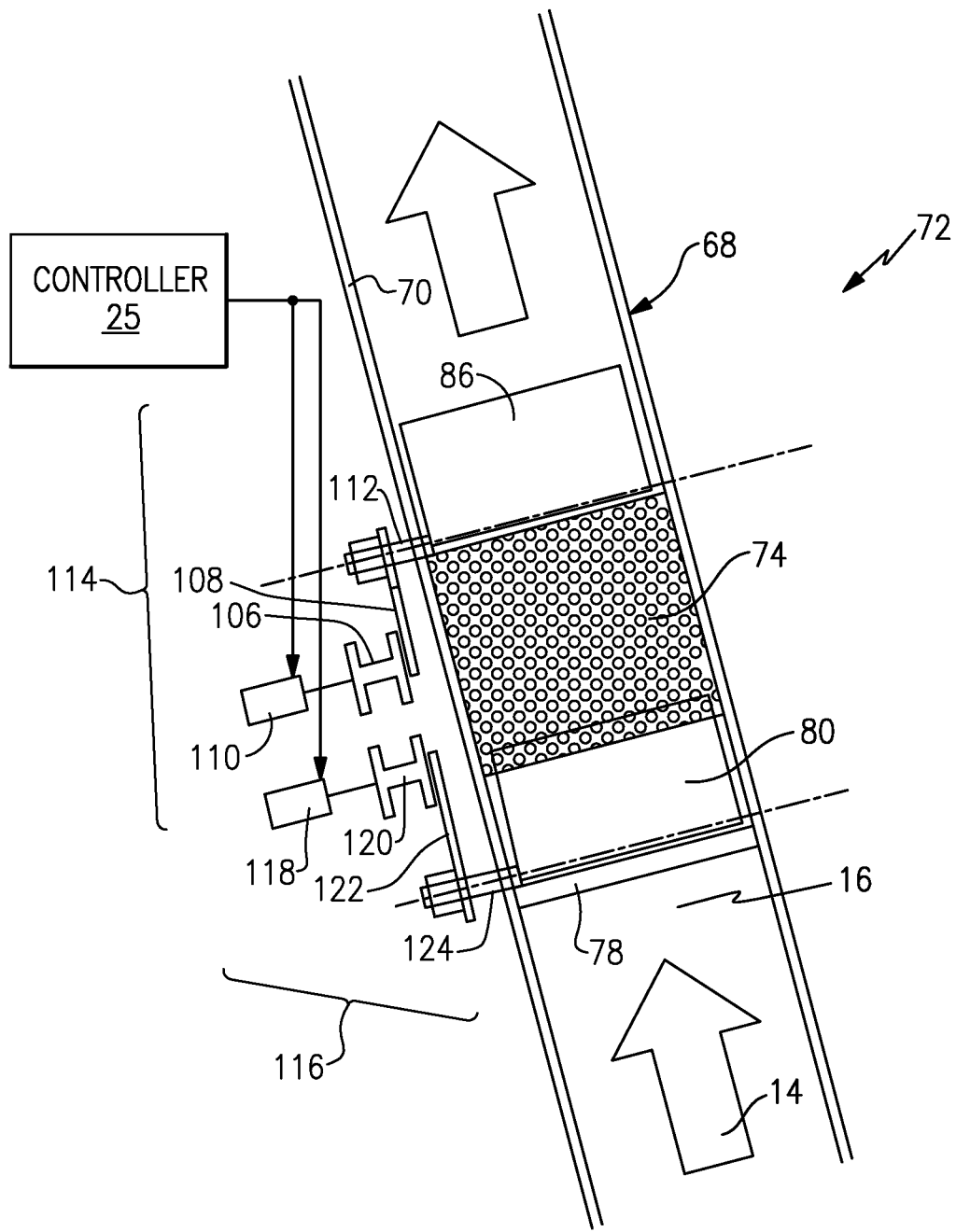
FIG. 7 is a cross-section of a portion of the example heat exchanger array.

Referring to FIG. 7, a forward actuator system 116 is provided for controlling and moving the forward vanes 80. An aft actuator system 114 is provided for controlling and moving the aft vanes 86. The forward actuator system 116 includes an actuator 118 that drives a synchronization ring 120 coupled to a shaft 124 by a vane arm 122. The actuator 118 is controlled by the controller 25. The aft actuator system 114 includes an actuator 110 that drives a synchronization ring 106 coupled to a shaft 112 by a vane arm 108. The controller 25 uses information obtained relevant to engine operation and adjusts the heat exchanger array 72 to provide increased thermal and/or propulsive efficiencies. The controller 25 adjusts the heat exchanger array 72 by way of the actuators 110 and 118 to balance thermal management requirements with propulsive engine requirements.

Accordingly, the example thermal management system 66 includes a variable heat exchanger array 72 with an adjustable thermal absorption capacity that can be tailored to engine operating conditions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine comprising:
   a duct defining an annular space;
   at least two heat exchangers arranged within the annular space and spaced circumferentially apart;
   a passage between the at least two heat exchangers;
   a forward flow control device operable for controlling airflow through the passage; and
   an aft flow control device disposed on either side of an outlet of the passage between the at least two heat exchangers for defining an outlet of the passage and of the at least two heat exchangers.

2. The turbine engine as recited in claim 1, wherein the forward flow control device is movable from an open position allowing airflow through the passage and a closed position blocking airflow through the passage to force all airflow through the at least two heat exchangers.

3. The turbine engine as recited in claim 2, wherein the forward flow control device is movable to a plurality of intermediate positions between the open position and the closed position to control airflow through the passage and the at least two heat exchangers.

4. The turbine engine as recited in claim 2, wherein the flow control device comprises a fixed fairing and two vanes movable outward from the fixed fairing between the open position and the closed position.

5. The turbine engine as recited in claim 4, wherein the fixed fairing is disposed forward of an inlet to the passage and the vanes extend aft of the fixed fairing.

6. The turbine engine as recited in claim 1, wherein the aft flow control device comprises a first vane disposed on a first side of the outlet and a second aft vane disposed on a second side of the outlet, the first vane and the second vane moveable between a first position defining a diverging nozzle through the passage and a second position defining a diverging nozzle of airflow exiting the at least two heat exchangers.

7. The turbine engine as recited in claim 6, wherein the aft flow control devices is moved to the first position when the forward flow control device is in an open position enabling airflow through the passage and the aft flow control device is moved to the second position when the forward flow control device is in a closed position.

8. The turbine engine as recited in claim 1, wherein the at least two heat exchangers comprise a plurality of heat exchangers extending about the entire annular space and a corresponding plurality of passages disposed between the plurality of heat exchangers.

9. The turbine engine as recited in claim 1, wherein the at least two heat exchangers comprise one of an air/oil heat exchanger, an air/fuel heat exchanger or an air/air heat exchanger.

10. The turbine engine as recited in claim 1, wherein the annular space is defined between a radially inner surface and radially outer surface of the duct and each of the least two heat exchangers extend entirely between the radially inner surface and the radially outer surface.

11. A thermal management system for a gas turbine engine comprising:
    a plurality of heat exchangers circumferentially spaced apart within an annular duct;
    a plurality of passages disposed within circumferential spaces between the plurality of heat exchangers; and
    a plurality of forward flow control devices for distributing airflow between the plurality of passages and the plurality of heat exchangers wherein each of the plurality of forward flow control devices comprise a fixed fairing and two vanes movable outward from the fixed fairing to a plurality of intermediate positions between an open position allowing airflow through the plurality of passages and a closed position blocking airflow through the plurality of passages to direct and proportionally control airflow through the plurality of heat exchangers and through the plurality of passages.

12. The thermal management system as recited in claim 11, including
    a plurality of aft flow control devices disposed at an outlet of each of the plurality of passages, wherein each of the plurality of aft flow control devices are movable to a first position defining a diverging nozzle through a corresponding one of the plurality of passages and a second position defining a diverging nozzle of airflow exiting a corresponding one of the plurality of heat exchangers.

13. A turbine engine comprising:
    a duct defining an annular space;
    at least two heat exchangers arranged within the annular space and spaced circumferentially apart;
    a passage between the at least two heat exchangers;
    a forward flow control device operable for controlling airflow through the passage wherein the forward flow control device is movable from an open position allowing airflow through the passage and a closed position blocking airflow through the passage to force all airflow through the at least two heat exchangers and wherein the flow control device comprises a fixed fairing and two vanes movable outward from the fixed fairing between the open position and the closed position.

14. The turbine engine as recited in claim 13, wherein the fixed fairing is disposed forward of an inlet to the passage and the vanes extend aft of the fixed fairing.

15. The turbine engine as recited in claim 14, including an aft flow control device disposed on either side of an outlet of the passage between the at least two heat exchangers for defining an outlet of the passage and of the at least two heat exchangers.

16. A thermal management system for a gas turbine engine comprising:
    a plurality of heat exchangers circumferentially spaced apart within an annular duct;
    a plurality of passages disposed within circumferential spaces between the plurality of heat exchangers;
    a plurality of forward flow control devices for distributing airflow between the plurality of passages and the plurality of heat exchangers; and
    a plurality of aft flow control devices disposed at an outlet of each of the plurality of passages, wherein each of the plurality of aft flow control devices are movable to a first position defining a diverging nozzle through a corresponding one of the plurality of passages and a second position defining a diverging nozzle of airflow exiting a corresponding one of the plurality of heat exchangers.

17. The thermal management system as recited in claim 16, wherein each of the plurality of forward flow control devices are movable from an open position allowing airflow through the passage and a closed position blocking airflow through the passage to direct airflow through the plurality of heat exchangers.

18. The thermal management system as recited in claim 17, wherein each of the plurality of forward flow control devices are movable to a plurality of intermediate positions between the open position and the closed position to proportionally control airflow through the plurality of passages and the plurality of heat exchangers.

19. The thermal management system as recited in claim 18, wherein each of the plurality of flow control devices comprise a fixed fairing and two vanes movable outward from the fixed fairing between the open position and the closed position.

* * * * *